United States Patent
Azralon et al.

(10) Patent No.: US 9,571,826 B1
(45) Date of Patent: Feb. 14, 2017

(54) INTEGRATED DIAGNOSTIC AND DEBUGGING OF REGIONAL CONTENT DISTRIBUTION SYSTEMS

(71) Applicant: CSC HOLDINGS, LLC, Bethpage, NY (US)

(72) Inventors: Alan Azralon, Bethpage, NY (US); Heitor Almeida, Westbury, NY (US); Ken Silver, Woodbury, NY (US)

(73) Assignee: CSC HOLDINGS, LLC, Bethpage, NY (US)

( * ) Notice: Subject to any disclaimer, the term of this patent is extended or adjusted under 35 U.S.C. 154(b) by 11 days.

(21) Appl. No.: 14/533,382

(22) Filed: Nov. 5, 2014

(51) Int. Cl.
*H04N 21/442* (2011.01)
*H04N 17/00* (2006.01)
*H04H 20/12* (2008.01)

(52) U.S. Cl.
CPC .......... *H04N 17/004* (2013.01); *H04N 21/442* (2013.01)

(58) Field of Classification Search
USPC ........................................................ 725/107
See application file for complete search history.

(56) References Cited

U.S. PATENT DOCUMENTS

| | | | | |
|---|---|---|---|---|
| 4,207,431 A * | 6/1980 | McVoy | | 379/22 |
| 5,003,591 A * | 3/1991 | Kauffman et al. | | 380/232 |
| 5,155,590 A * | 10/1992 | Beyers et al. | | 725/107 |
| 6,802,032 B1 * | 10/2004 | Budinger | H04L 12/2697 | 709/221 |
| 6,853,680 B1 * | 2/2005 | Nikolich | H04L 12/2697 | 375/222 |
| 7,116,685 B2 * | 10/2006 | Brown et al. | | 370/485 |
| 7,162,731 B2 * | 1/2007 | Reidhead | H04L 1/24 | 725/107 |
| 8,000,254 B2 * | 8/2011 | Thompson | H04L 12/2697 | 370/247 |
| 8,352,995 B2 * | 1/2013 | Sadja et al. | | 725/107 |
| 2004/0003070 A1 * | 1/2004 | Fernald | H04L 12/2602 | 709/223 |
| 2005/0021311 A1 * | 1/2005 | Deb | G05B 23/0216 | 702/188 |
| 2005/0183130 A1 * | 8/2005 | Sadja et al. | | 725/107 |
| 2006/0218616 A1 * | 9/2006 | Schemmann | H04N 7/173 | 725/129 |
| 2007/0180532 A1 * | 8/2007 | Cha et al. | | 726/25 |
| 2007/0256114 A1 * | 11/2007 | Johnson et al. | | 725/139 |
| 2007/0274223 A1 * | 11/2007 | Cha et al. | | 370/241 |
| 2008/0284909 A1 * | 11/2008 | Keohane et al. | | 348/468 |
| 2010/0157824 A1 * | 6/2010 | Thompson | H04L 12/2697 | 370/252 |
| 2010/0313230 A1 * | 12/2010 | Van Doorn et al. | | 725/107 |
| 2011/0099570 A1 * | 4/2011 | Sadja et al. | | 725/16 |

(Continued)

*Primary Examiner* — Nathan Flynn
*Assistant Examiner* — Caroline Somera
(74) *Attorney, Agent, or Firm* — Sterne, Kessler, Goldstein & Fox PLLC

(57) ABSTRACT

System, method, and computer program product embodiments are disclosed for integrated diagnosis and debugging of content distribution systems. A system includes a networking module that receives, from a central server system, instructions for running network diagnostics on a cable headend. A diagnostics environment module is configured to perform diagnostic operations based on the received instructions. The networking module transmits results of the diagnostic operations to the central server system.

20 Claims, 5 Drawing Sheets

(56) References Cited

U.S. PATENT DOCUMENTS

| | | | |
|---|---|---|---|
| 2011/0211456 A1* | 9/2011 | Caveney | H04L 43/0811 370/241 |
| 2012/0124606 A1* | 5/2012 | Tidwell et al. | 725/17 |
| 2013/0125183 A1* | 5/2013 | Gomez | H04N 17/00 725/107 |
| 2013/0132991 A1* | 5/2013 | Wilson | H04H 20/12 725/14 |
| 2013/0291034 A1* | 10/2013 | Basile et al. | 725/107 |
| 2013/0305302 A1* | 11/2013 | Salinger | H04N 17/004 725/107 |
| 2014/0122931 A1* | 5/2014 | Devale | G06F 11/34 714/37 |
| 2014/0218542 A1* | 8/2014 | Blair | H04N 7/173 348/182 |
| 2015/0082363 A1* | 3/2015 | Gomez et al. | 725/107 |
| 2015/0095960 A1* | 4/2015 | Hurst et al. | 725/107 |

\* cited by examiner

INTEGRATED DIAGNOSTIC AND DEBUGGING OF REGIONAL CONTENT DISTRIBUTION SYSTEMS

BACKGROUND

Technical Field

This application relates to network management generally, and in particular, to diagnosis and debugging in cable distribution systems.

Background

Monitoring content distribution systems can be difficult due to the size and extent of networks and their components. For example, cable distribution systems reach many locations, including remote and sparsely populated areas, and individually maintaining and monitoring all of them can be a costly and non-trivial task. A technical failure in one component can affect a large extent of the network, and locating the cause of the failure can require substantial information gathering and diagnosis effort.

The difficulties of network monitoring in turn complicate the rollout of upgrades and new software to network components. Testing new releases in a real-world environment risks causing costly failures, and therefore developers may need to spend substantial effort ensuring software is deploy-ready before releasing it on the network.

SUMMARY

In view of the above, it would be desirable to provide methods and systems for performing integrated diagnosis and debugging of content distribution systems.

System, method, and computer program product embodiments are disclosed for integrated diagnosis and debugging of content distribution systems. A system includes a networking module that receives, from a central server system, instructions for running network diagnostics on a cable headend. A diagnostics environment module is configured to perform diagnostic operations based on the received instructions. The networking module transmits results of the diagnostic operations to the central server system.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for performing integrated diagnosis and debugging of content distribution systems.

Figure 1:
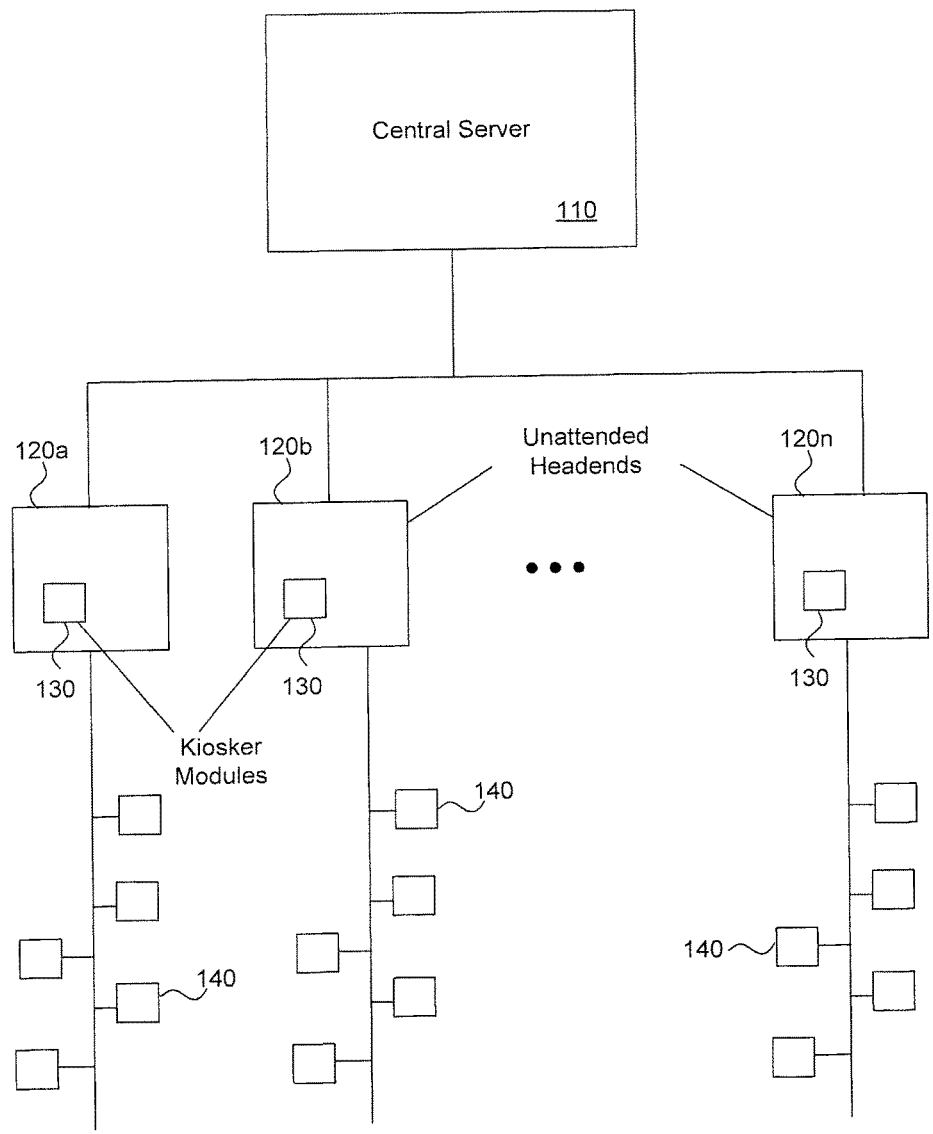
FIG. 1 is a block diagram illustrating a cable infrastructure integrating a diagnosis and debugging kiosker module, according to an example embodiment.

FIG. 1 is a block diagram illustrating a cable infrastructure 100 integrating a diagnosis and debugging module, according to an example embodiment. Cable infrastructure 100 includes a central server system 110 connected to one or more cable headends 120a-n.

A cable headend 120 is a facility for receiving and distributing television signals over a cable television system. Headends 120 can include satellite dishes that receive television channels from satellites. Headends 120 may also receive television channels through coaxial, fiber-optic, microwave links, etc. Headends 120 distribute television channels to end users 140 through broadband communications channels, such as, for example, coaxial lines, fiber-optic lines, satellite communications, etc. Headends 120 can also provide cable internet and cable telephony services to end users 140.

End user devices 140 can be any device connected to headends 120 to obtain access to services provided by cable infrastructure 100, such as, for example, cable television, cable internet, cable telephony, etc. For example, end users devices 140 can be a set-top box, a cable modem, etc.

In an embodiment, Kiosker modules 130 are integrated into cable infrastructure 100 in order to, among other things, perform monitoring and diagnostics functions. In an embodiment, kiosker modules 130 include hardware and an onboard set of software tools that allows remote monitoring, configuration and diagnostic functionality. Kiosker modules 130 can be self-recovering, for example, by being able to integrate into cable infrastructure 100 without manual user configuration at the headend.

For example, a kiosker module 130 can be connected to an unattended headend 120b in a remote location. Headend 120b might may not be staffed by qualified technicians with proper knowledge for detecting and resolving problems. A person staffing the headend 120b might physically connect a kiosker module 130 to headend 120b. In an embodiment, kiosker module 130 can automatically find central server system 110 and initiate communication. In other embodiments, a kiosker modules 130 can be connected to other elements in cable infrastructure 100, such as, for example, an end user connection.

From central server system 110, administrators can manage kiosker modules 130. Central server system 110 can be configured to control, configure, and monitor the actions of kiosker modules 130. Central server system 110 can include interfaces for receiving commands from network management systems or administrators of cable infrastructure 100. For example, central server system 110 can send instructions to and collect data flows from kiosker modules 130. Central server system 110 can also perform archiving and trend analysis of system performance parameters and initiate automated response actions with headends and other cable infrastructure components based on the analysis.

Figure 2:
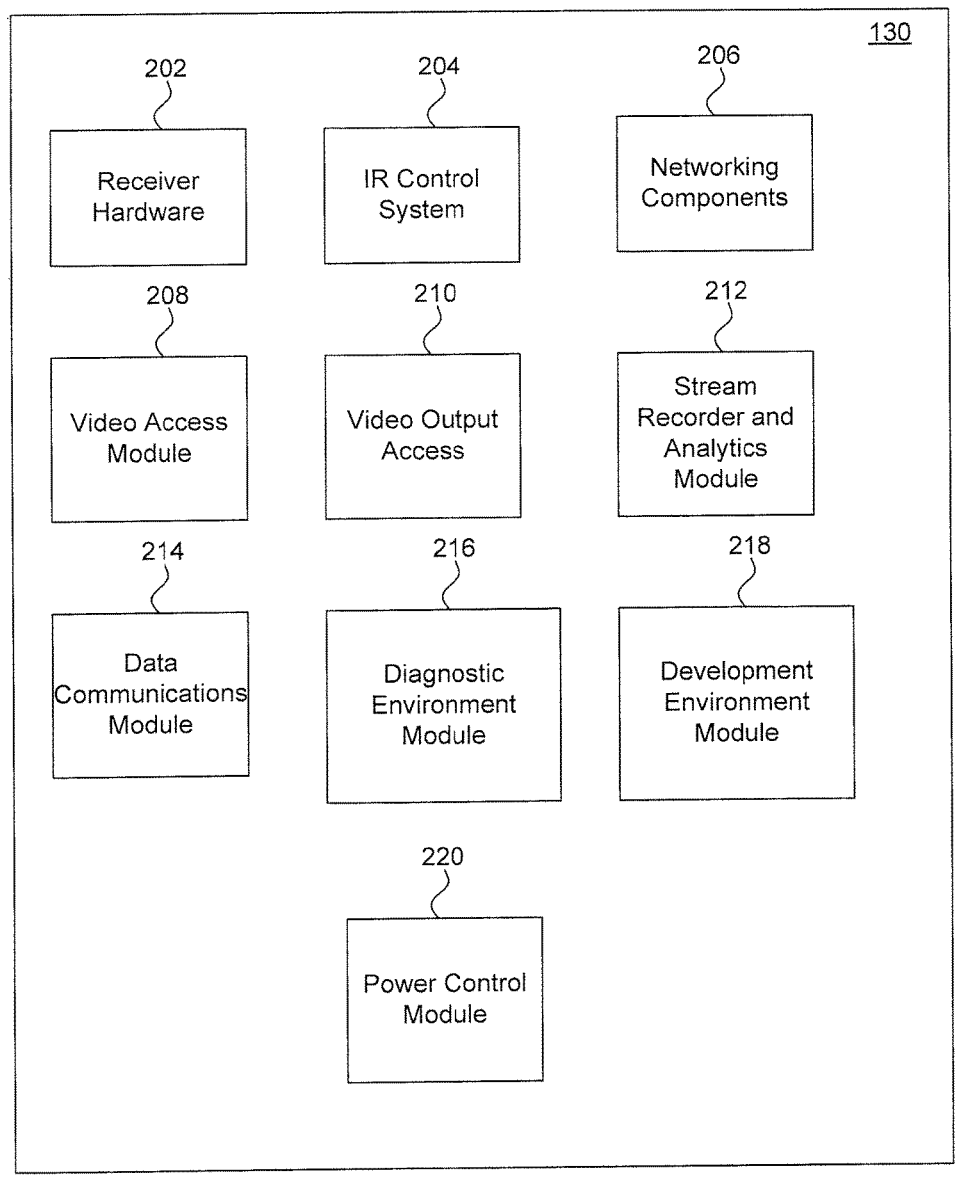
FIG. 2 is a block diagram illustrating details of a kiosker module, according to an example embodiment.

FIG. 2 is a block diagram illustrating details of a kiosker module 130, according to an example embodiment.

Kiosker module 130 can include receiver hardware 202, infrared (IR) control system 204, networking components 206, video access module 208, video output access 210, stream recorder and analytics module 212, data communications module 214, diagnostic environment module 216, and development environment module 218 and a power control module 220. Each of the blocks and modules in FIG. 2 may be implemented in hardware, software, firmware, or any combination thereof.

In an embodiment, the various modules of kiosker 130 in combination can perform functions analogous to those of end user devices 140, such as, for example, the functions of a set-top box, a cable modem, a digital video recorder (DVR), etc. Additionally, kiosker 130 can include functionalities for performing network failure diagnostic, monitoring, code testing, and debugging for cable infrastructure 100. The modules described herein exemplify the functionalities that kiosker 130 can perform. However, these module and block boundaries have been arbitrarily defined for clarity of description, and embodiments may combine, further separate or omit these boundaries.

Receiver hardware 202 can be hardware configured to receive signals from a headend 120. For example, receiver hardware 202 can be configured to tune video channels distributed by headend 120 and receive data communications signals from headend 120.

Infrared control system 204 can be hardware configured to receive IR signals from, for example, a remote control. The IR can be used to configure and control the kiosker module 130.

Networking components 206 can be configured to transmit data to and receive data from central server system 110. For example, networking components 206 can receive instructions, data collection scripts, diagnostic scripts, data mining scripts, etc., from central server system 110. Networking components 206 can be used to transmit results of scripts and tests to central server system 110.

Video access module 208 can be configured to access video channels through receiver hardware 202.

Video output access 210 can be configured to output a video signal for display based a received video channel signal.

Stream recorder and analytics module 212 can be configured to record video data from a received video channel. In an embodiment, stream recorder and analytics module 212 can perform functions analogous to those of a digital video recorder (DVR).

Data communications module 214 can be configured to transmit data through cable infrastructure 100. In an embodiment, data communications module 214 can be a cable modem configured to transmit and receive data through cable lines.

Diagnostic environment module 216 and development environment module 218 can interact with modules 202-214 in order to perform functions related to monitoring, diagnosing, debugging, developing, and testing network connectivity and system features of cable infrastructure 100.

Diagnostic environment module 216 can comprise tools for implementing and executing diagnostic tasks, such as, for example, data gathering scripts, data mining scripts, etc. In an embodiment, diagnostic environment module 216 can interpret and execute scripts received from central server system 110. For example, diagnostic environment module can, based on instructions received in a script, tune channels or perform other related actions to acquire and view video or informational content, and detect whether any errors in video channel or informational signals are detected. A central server may, for example, send such a script to multiple kiosker modules 130, and obtain diagnostic information from various locations in cable infrastructure 100. In this manner, central server system 110 may detect and locate system faults.

Development environment module 218 can comprise tools for implementing and executing software features for use in cable infrastructure 100. For example, development environment module can, based on instructions received from central server system 110, implement new set-top box features for testing. In an embodiment, development environment module can receive a code image for injection into kiosker 130. Development environment module 218 may also return debugging information on the code to central server system 110. In this manner, kiosker 130 can be used to test and debug code in the real-world cable infrastructure 100 environment before deployment to end user devices 140, thus avoiding disturbing ongoing service to customers.

Power control module 220 may be used to monitor the power status of the sub-components of kiosker module 130, and for remote recovery of sub-components that may require hard reset. The various modules and components of kiosker 130 may be subject to occasional crashes due to the nature of the test applications and rugged field conditions that kiosker 130 may operate in. Moreover, some test procedures may involve deliberately performing a power off-on cycle on one or more of the modules as part of a test script or procedure. In an embodiment, power control module includes an administration interface and individually addressable power outlets. The interfaces may be addressable by local and/or remote networking interfaces, such as, for example, Ethernet interfaces. Via the remote and local interfaces, the power control module 220 can be used for the remote recovery of crashed modules and as part of local or remote test scripts. Power control module 220 may also be set to monitor the power status of the kiosker 130 sub-components that are discretely powered, and may take action depending on the status. For example, if a module is supposed to be powered and is not drawing electrical power, then power control module 220 can autonomously execute a power cycle in an attempt to recover the module.

Figure 3:
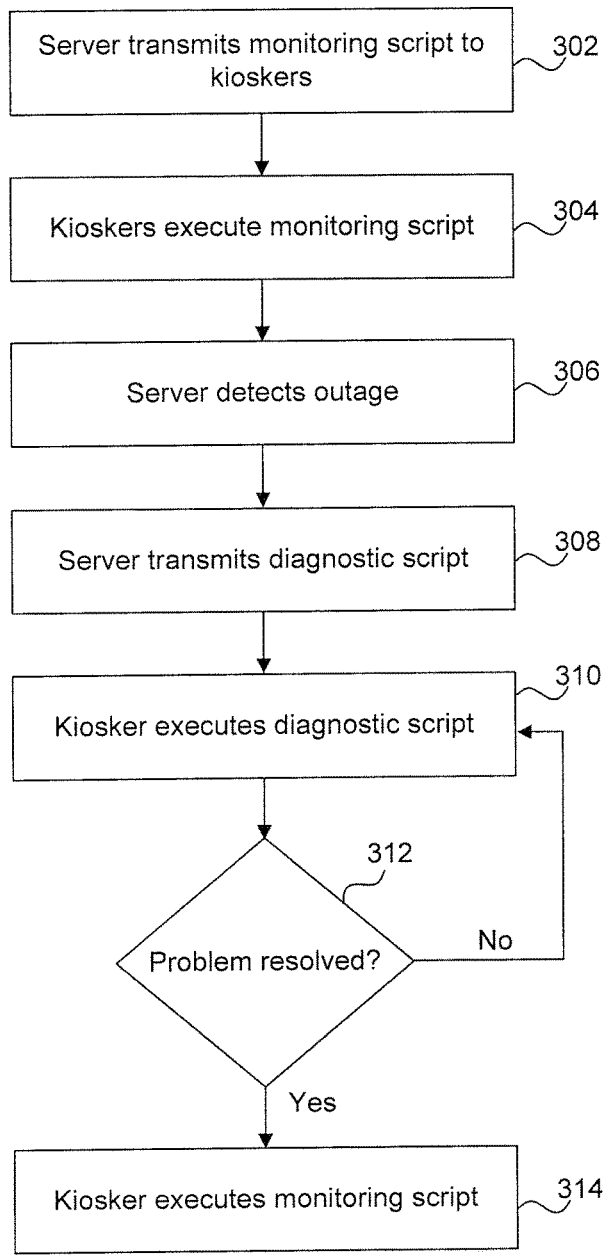
FIG. 3 is a flowchart illustrating a method of performing diagnostic operations using a central server system and kiosker modules, according to an example embodiment.

FIG. 3 is a flowchart illustrating a method of performing diagnostic operations using a central server system 110 and kiosker modules 130, according to an example embodiment.

At step 302, central server system 110 transmits a monitoring script to various kiosker modules 130. In an example, the monitoring script instructs kioskers to tune channels every 15 second and send general purpose logs back to central server system 110.

At step 304, kioskers 130 perform the monitoring script. In an example, the kioskers tune channels every 15 seconds and send logs to central server system 110.

At step 306, central server system 110, based on the analysis of the logs received from kiosker modules 130, detects that an outage has occurred at the area of one of the kioskers 130. Based on information from the logs, central server system 110 can determine information useful in determining the cause and possible resolution of the outage. For example, central server system 110 may determine the type of outage that has occurred (e.g., Type 1 outage), and the geographic area of the outage (e.g., Area A).

At step 308, central server system 110 injects a diagnostic script to various kiosker modules in the area of the outage, e.g., Area A. The diagnostic script may be configured to deal with Type 1 outages.

At step 310, kioskers 130 perform the diagnostic script and report data back to central server system 110.

As described in steps 312 and 314, once the problem has been resolved, kioskers 130 can stop executing the diagnostic script and revert to executing the monitoring script. For example, central server system 110 can transmit an instruction to kioskers 130 to stop executing the diagnostic script and re-initiate the monitoring script.

Figure 4:
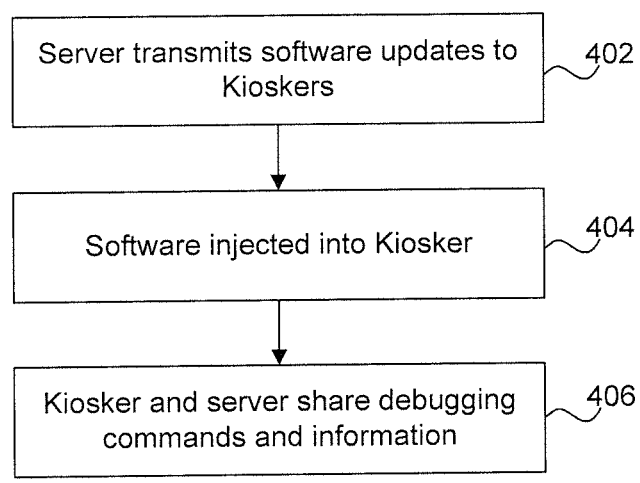
FIG. 4 is a flowchart illustrating a method of performing development testing using a central server system and kiosker modules, according to an example embodiment

FIG. 4 is a flowchart illustrating a method of performing development testing using a central server system 110 and kiosker modules 130, according to an example embodiment.

At step 402, central server system 110 can transmit a software code update to various kiosker modules 130. For example, the software code can be a firmware upgrade for set-top boxes and DVRs that developers may want to test before deploying to actual end users. In an example, the central server system 110 communicates with development environment module 218 to inject the code into kioskers for testing.

At step 404, development environment module 218 injects the code into the appropriate module of kiosker 130. For example, development environment module 218 can inject the code into the video access module 208 and stream recorder and analytics module 212.

At step 406, development environment module 218 and central server system 110 can share debugging commands and information for testing the code. For example, central server system 110 can transmit a request for debugging information and development environment module 218 can obtain and transmit the debugging information.

EXAMPLE COMPUTER SYSTEM

Figure 5:
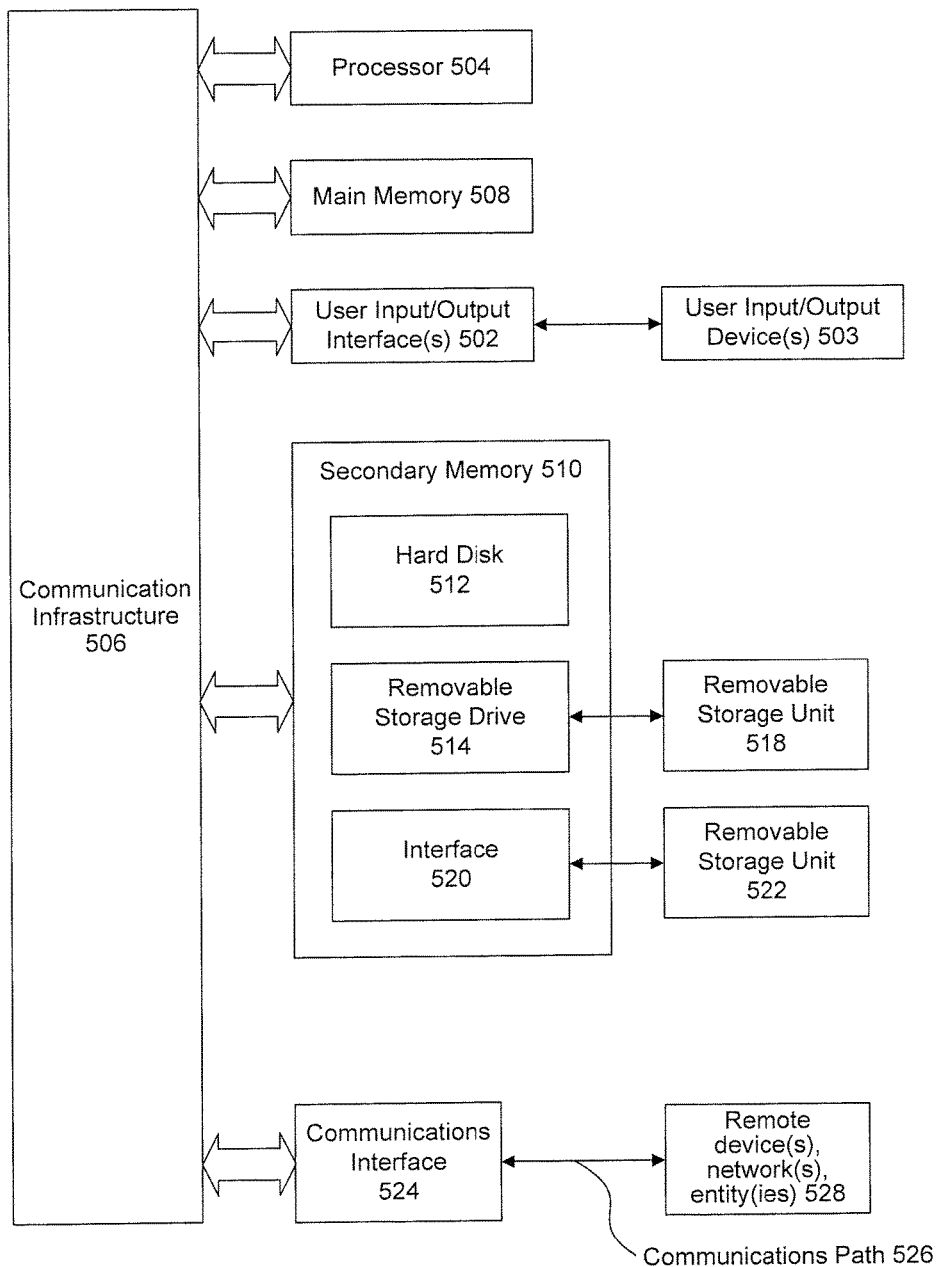
FIG. 5 is an example computer system useful for implementing various embodiments.

Various embodiments can be implemented, for example, using one or more computer systems, such as computer system 500 shown in FIG. 5. Computer system 500 can be any general purpose computer capable of performing the functions described herein, such as computers available from International Business Machines, Apple, Sun, HP, Dell, Sony, Toshiba, etc.

Computer system 500 includes one or more processors (also called central processing units, or CPUs), such as a processor 504. Processor 504 is connected to a communication infrastructure or bus 506.

Computer system 500 also includes user input/output device(s) 503, such as monitors, keyboards, pointing devices, etc., which communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 5. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A cable headend, comprising:
   a memory;
   a processor coupled to the memory; and
   a kiosker module configured to operate using the processor and the memory of the cable headend, and comprising:
      a networking module configured to receive, from a central server, a monitoring script to monitor operations of the cable headend,
      a diagnostics environment module configured to monitor the operations of the cable headend, and
      a development environment module configured to install a software code relating to an update of a previously installed software code or to new software code that has not been previously installed,
   wherein the networking module is further configured to:
      transmit results of the monitoring to the central server, and
      receive, from the central server, a diagnostics script upon the central server detecting an outage based upon the results of the monitoring, the diagnostics script being configured to resolve the outage,
   wherein the diagnostics environment module is further configured to perform diagnostic operations on the cable headend in accordance with the diagnostics script to resolve the outage,
   wherein the networking module is further configured to:
      transmit results of the diagnostic operations to the central server, and
      receive, from the central server, the software code, and
   wherein the development environment module is further configured to
      transmit information related to the installed software code to the central server.

2. The cable headend of claim 1, wherein the diagnostic operations comprise tuning a channel, and
   wherein the networking module is configured to transmit reporting logs of the tuning as the results of the monitoring to the central server.

3. The cable headend of claim 1, wherein the diagnostic operations comprise:
   actions to acquire video or informational content at a specified time interval.

4. The cable headend of claim 1, wherein the networking module is further configured to receive, from the central server, instructions for performing debugging operations on the software code.

5. A computer implemented method for network monitoring, the method comprising:
   receiving, at a cable headend and from a central server, a monitoring script to monitor operations of the cable headend and a software code relating to an update of a previously installed software code or to new software code that has not been previously installed;
   installing the software code;
   transmitting, at the cable headend, information related to the installed software code to the central server;
   monitoring, at the cable headend, the operations of the cable headend in accordance with the monitoring script;
   transmitting, at the cable headend, results of the monitoring to the central server;
   receiving, at the cable headend, a diagnostics script from the central server upon the central server detecting an outage based upon the results of the monitoring, the diagnostics script being configured to resolve the outage;
   performing diagnostic operations on the cable headend in accordance with the diagnostics script to resolve the outage; and
   transmitting results of the diagnostic operations to the central server.

6. The method of claim 5, wherein the performing comprises:
   tuning a channel, and
   wherein the transmitting the results comprises:
      reporting logs of the tuning to the central server.

7. The method of claim 5, wherein the diagnostic operations comprise:
   actions to acquire video or informational content at a specified time interval.

8. The method of claim 5, further comprising:
   receiving, from the central server, instructions for performing debugging operations on the software code.

9. A non-transitory computer-readable medium having instructions stored thereon that, when executed by at least one computing device, causes the at least one computing device to perform operations comprising:
   receiving, at a cable headend and from a central server, a monitoring script to monitor operations of the cable headend and a software code relating to an update of a previously installed software code or to new software code that has not been previously installed;
   installing the software code;
   transmitting, at the cable headend, information related to the installed software code to the central server;
   monitoring, at the cable headend, the operations of the cable headend in accordance with the monitoring script;
   transmitting, at the cable headend, results of the monitoring to the central server;
   receiving, at the cable headend, a diagnostics script from the central server upon the central server detecting an outage based upon the results of the monitoring, the diagnostics script being configured to resolve the outage;
   performing diagnostic operations on the cable headend in accordance with the diagnostics script to resolve the outage; and transmitting results of the diagnostic operations to the central server.

10. The computer-readable medium of claim 9, wherein the performing comprises:
    tuning a channel, and
    wherein the transmitting the results comprises:
        reporting logs of the tuning to the central server.

11. The computer-readable medium of claim 9, wherein the diagnostic operations comprise:
    actions to acquire video or informational content at a specified time interval.

12. The computer-readable medium of claim 9, the operations further comprising:
    receiving, from the central server, instructions for performing debugging operations on the software code.

13. The cable headend of claim 2, wherein the diagnostic operations comprise tuning the channel at predefined time intervals.

14. The cable headend of claim 1, wherein the diagnostics script comprises:
    instructions specific to a type of the outage as determined by the central server.

15. The cable headend of claim 1, wherein the kiosker module is further configured to integrate into the cable headend without manual configuration.

16. The cable headend of claim 15, wherein the kiosker module is further configured to initiate communication with the central server, wherein the communication results in receipt of the diagnostic operations.

17. The method of claim 5, wherein the central server determines a type of the outage, and
    wherein the receiving the diagnostics script comprises:
        receiving the diagnostics script, the diagnostics script being specific to resolve the type of the outage.

18. The cable headend of claim 4, wherein the diagnostics environment module is further configured to perform the debugging operations on the software code in accordance with the instructions for performing debugging operations on the software code.

19. The method of claim 8, further comprising:
    performing the debugging operations on the software code in accordance with the instructions for performing debugging operations on the software code.

20. The computer-readable medium of claim 12, further comprising:
    performing the debugging operations on the software code in accordance with the instructions for performing debugging operations on the software code.

\* \* \* \* \*